US 12,553,660 B2

(12) United States Patent
Chhajed et al.

(10) Patent No.: US 12,553,660 B2
(45) Date of Patent: Feb. 17, 2026

(54) FOAMED-IN PASSTHROUGH COVER ASSEMBLY

(71) Applicant: WHIRLPOOL CORPORATION, Benton Harbor, MI (US)

(72) Inventors: Rahul Subhash Chhajed, Stevensville, MI (US); Abinash Sarma, Tinsukia (IN)

(73) Assignee: Whirlpool Corporation, Benton Harbor, MI (US)

(*) Notice: Subject to any disclaimer, the term of this patent is extended or adjusted under 35 U.S.C. 154(b) by 208 days.

(21) Appl. No.: 18/220,987

(22) Filed: Jul. 12, 2023

(65) Prior Publication Data

US 2025/0020393 A1 Jan. 16, 2025

(51) Int. Cl.
*F25D 23/06* (2006.01)
*B29D 99/00* (2010.01)
*B29K 75/00* (2006.01)
*B29K 105/04* (2006.01)

(52) U.S. Cl.
CPC ....... *F25D 23/066* (2013.01); *B29D 99/0021* (2013.01); *B29K 2075/00* (2013.01); *B29K 2105/04* (2013.01); *F25D 2201/126* (2013.01); *F25D 2201/14* (2013.01)

(58) Field of Classification Search
CPC .... F25D 23/065; F25D 23/066; F25D 23/068; F25D 23/061; F25D 2201/14; F25D 2323/06
See application file for complete search history.

(56) References Cited

U.S. PATENT DOCUMENTS

| 2,783,065 | A | * | 2/1957 | Martin | F25D 23/065 |
| | | | | | 62/DIG. 13 |
| 4,180,297 | A | * | 12/1979 | Abrams | F25D 23/065 |
| | | | | | 16/2.2 |
| 5,238,299 | A | | 8/1993 | McKinney | |
| 5,743,109 | A | * | 4/1998 | Schulak | F25D 16/00 |
| | | | | | 62/428 |
| 10,830,384 | B2 | | 11/2020 | Allard et al. | |
| 11,175,089 | B2 | | 11/2021 | Marinello et al. | |
| 11,624,551 | B2 | | 4/2023 | Chhajed et al. | |

(Continued)

FOREIGN PATENT DOCUMENTS

| CN | 201340154 Y | 11/2009 |
| CN | 103975212 B | 2/2016 |

(Continued)

*Primary Examiner* — Daniel J Rohrhoff
(74) *Attorney, Agent, or Firm* — Price Heneveld LLP

(57) ABSTRACT

A vacuum insulated appliance includes a cabinet with an outer wrapper and an inner liner coupled to the outer wrapper to define an insulation cavity. The cabinet defines a passthrough opening through the outer wrapper and the inner liner. A passthrough cover is coupled to the cabinet over the passthrough opening. The passthrough cover has a bottom wall defining at least one service hole. A passthrough cavity is defined between the cabinet and the passthrough cover. At least one foam injection port is defined by the passthrough cover, and an expanding foam is disposed within the passthrough cavity. The expanding foam is configured to be inserted through the at least one foam injection port to at least partially fill the passthrough cavity.

20 Claims, 16 Drawing Sheets

(56) References Cited

U.S. PATENT DOCUMENTS

| | | | | |
|---|---|---|---|---|
| 2003/0201701 | A1* | 10/2003 | Banicevic | F25D 23/068 |
| | | | | 312/401 |
| 2005/0173323 | A1 | 8/2005 | Meuleners et al. | |
| 2016/0305704 | A1 | 10/2016 | Fähnle et al. | |
| 2017/0167782 | A1* | 6/2017 | Diptesh | F25D 23/066 |
| 2019/0178562 | A1* | 6/2019 | Naik | F25D 23/065 |
| 2020/0033049 | A1* | 1/2020 | Dherde | F16L 59/121 |
| 2020/0318888 | A1* | 10/2020 | Naik | F16L 59/065 |
| 2022/0034581 | A1* | 2/2022 | You | F25D 23/006 |
| 2022/0065522 | A1* | 3/2022 | Chhajed | F25D 23/066 |
| 2024/0410643 | A1* | 12/2024 | Bet | F25D 23/068 |
| 2025/0198693 | A1* | 6/2025 | Ferreira | F25D 29/005 |

FOREIGN PATENT DOCUMENTS

| | | |
|---|---|---|
| DE | 102009032475 A1 | 1/2011 |
| WO | 2015082249 A1 | 6/2015 |

\* cited by examiner

FOAMED-IN PASSTHROUGH COVER ASSEMBLY

BACKGROUND OF THE DISCLOSURE

The present disclosure generally relates to a passthrough cover assembly, and more specifically, to a foamed-in passthrough cover assembly for a vacuum insulated appliance.

SUMMARY OF THE DISCLOSURE

According to an aspect of the present disclosure, a vacuum insulated appliance includes a cabinet including an outer wrapper and an inner liner coupled to the outer wrapper to define an insulation cavity. The cabinet defines a passthrough opening through the outer wrapper and the inner liner. A passthrough cover is coupled to the cabinet over the passthrough opening. The passthrough cover has a bottom wall defining at least one service hole. A passthrough cavity is defined between the cabinet and the passthrough cover. At least one foam injection port is defined by the passthrough cover, and an expanding foam is disposed within the passthrough cavity. The expanding foam is configured to be inserted through the at least one foam injection port to at least partially fill the passthrough cavity.

According to another aspect of the present disclosure, a vacuum insulated assembly includes a vacuum insulated structure having a structural wrapper defining an insulation cavity, where an at least partial vacuum is defined in the insulation cavity. A passthrough opening is defined through the vacuum insulated structure. A passthrough cover is coupled to the vacuum insulated structure over the passthrough opening. The passthrough cover has a bottom wall defining a service hole. A foam injection port is defined by the passthrough cover. A foam cavity is at least partially defined between the structural wrapper and the passthrough cover. An expanding foam at least partially fills the foam cavity. The foam injection port is configured to allow the injection of the expanding foam in the foam cavity.

According to yet another aspect of the present disclosure, a method for manufacturing a vacuum insulated structure includes providing a structural wrapper with an insulation cavity, the structural wrapper defining a passthrough opening, drawing an at least partial vacuum within the insulation cavity, and routing a plurality of service connections through the passthrough opening. The method further includes coupling a passthrough cover to the structural wrapper over the passthrough opening, routing the plurality of service connectors through the plurality of service holes defined by a bottom wall of the passthrough cover, and injecting an expanding and curing foam through at least one injection port of the passthrough cover to at least partially fill a foam cavity defined between the structural wrapper and the passthrough cover around the plurality of service connectors. The at least one injection port is defined on a back wall of the passthrough cover.

These and other features, advantages, and objects of the present disclosure will be further understood and appreciated by those skilled in the art by reference to the following specification, claims, and appended drawings.

Figure 1:
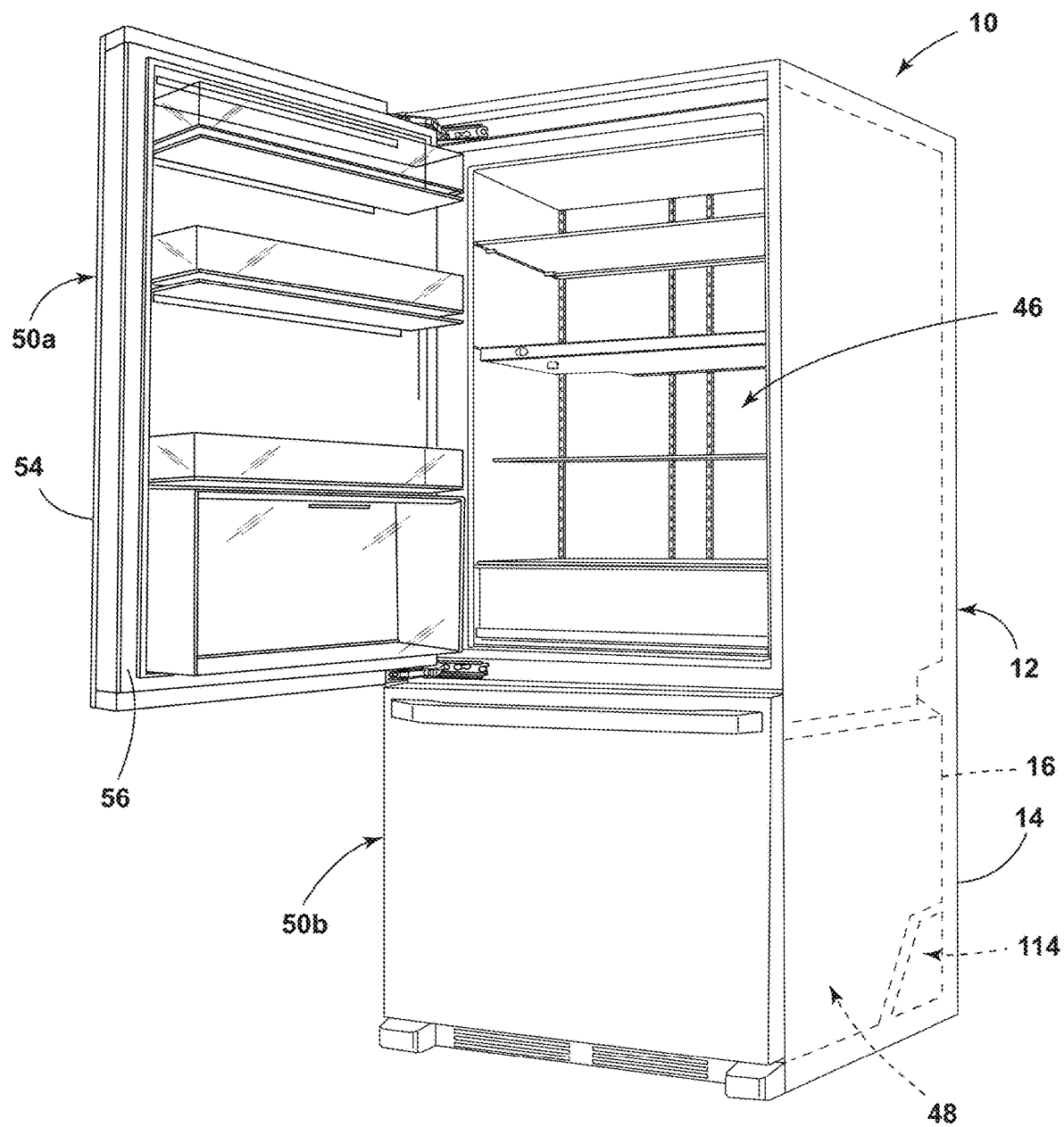
FIG. 1 is a front perspective of a refrigeration appliance, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a passthrough cover. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-16, reference numeral 10 generally designates a vacuum insulated appliance. The vacuum insulated appliance 10 includes a cabinet 12 including an outer wrapper 14 and an inner liner 16 coupled to the outer wrapper 14 to define an insulation cavity 18. The cabinet 12 defines a passthrough opening 20 through the outer wrapper 14 and the inner liner 16. A passthrough cover 22 is coupled to the cabinet 12 over the passthrough opening 20. The passthrough cover 22 has a bottom wall 24 defining a service hole 26 or a plurality of service holes 26, which may include service holes 26a-26d, which may collectively be referred to as the service holes 26 or at least one service hole 26. A passthrough or foam cavity 28 is defined between the cabinet 12 and the passthrough cover 22. The passthrough cover 22 defines an injection port 30 or a plurality of injection ports 30, which may include a first injection port 30b and a second injection 30b, which can collectively be referred to as the injection ports 30 or at least one injection port 30. An expanding foam 32 is disposed within the cavity 28. The expanding foam 32 is configured to be inserted through the foam injection port 30 to at least partially fill the cavity 28.

Figure 2:
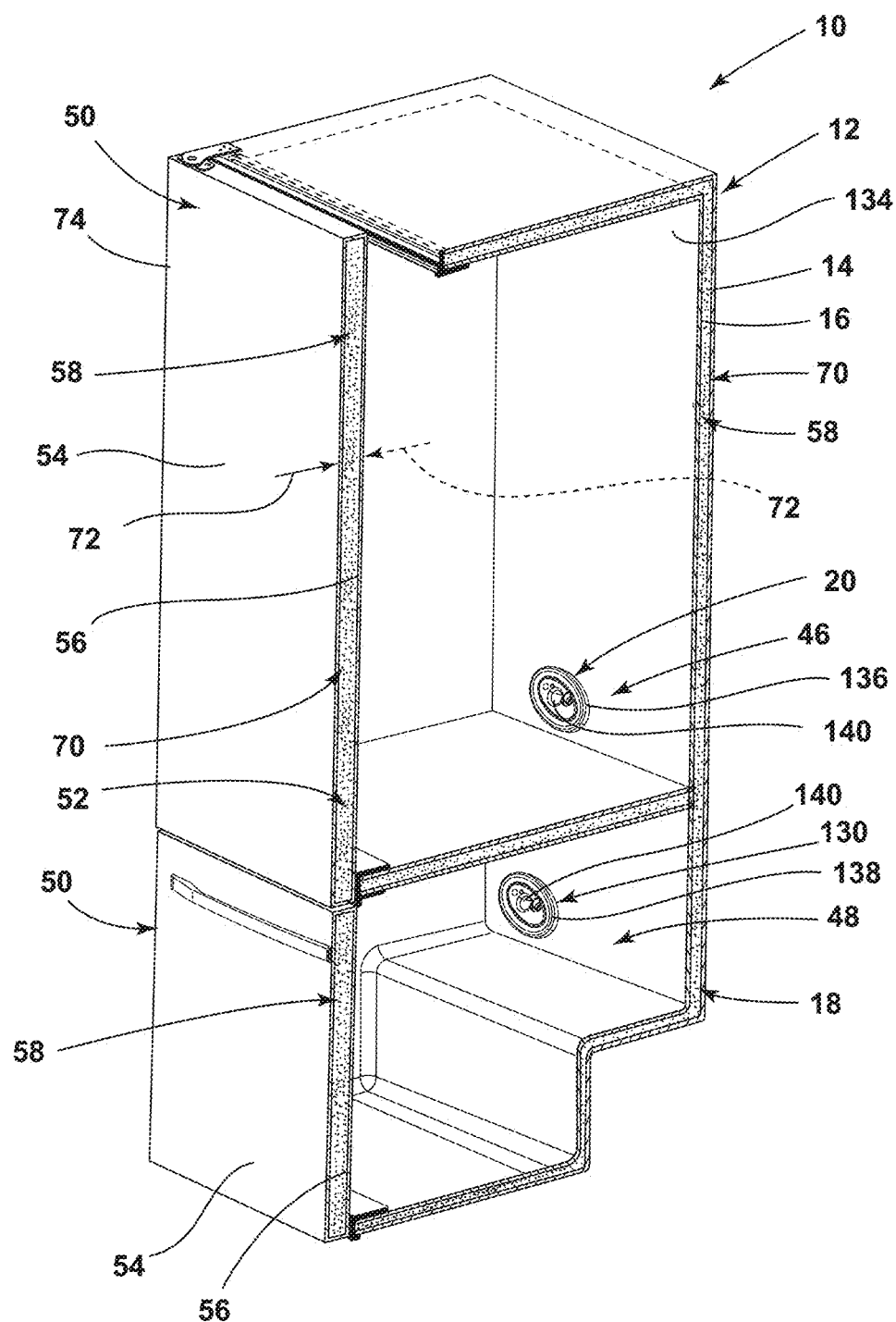
FIG. 2 is a cross-sectional view of a refrigeration appliance with a vacuum insulated cabinet and vacuum insulated doors, according to the present disclosure.

Referring to FIGS. 1 and 2, the vacuum insulated appliance 10 is illustrated as a refrigeration appliance, however, it is contemplated that the vacuum insulated appliance 10 disclosed herein may be for a variety of appliances, structures, panels, or assemblies for insulation purposes other than with an appliance. The refrigeration appliance 10 is illustrated as a bottom-mount refrigerator having an upper compartment configured as a refrigerator compartment 46 and a lower compartment configured as a freezer compartment 48.

The cabinet 12 of the illustrated refrigeration appliance 10 includes a first insulated door 50a and a second insulated door 50b. The first insulated door 50a and the second insulated door 50b, which can collectively be referred to as the insulated doors 50, can have substantially similar configurations, as discussed further herein. In this way, the insulated doors 50a, 50b can seal the refrigerator and freezer compartments 46, 48 defined by the cabinet 12, respectively. Moreover, in various implementations, the appliance 10 may include the cabinet 12 defining at least a first compartment, such as the refrigerator compartment 46, and a second compartment, such as the freezer compartment 48, sealed with insulated doors 50. The appliance 10 may be, for example, a bottom-mount French door refrigerator, a top-mount refrigerator, a side-by-side refrigerator, a 4-door French door refrigerator, and/or a 5-door French door refrigerator. Further, the present disclosure is not limited to refrigerators. The appliance 10 may be, for example, freezers, coolers, vacuum insulated structures, and other similar appliances and fixtures within household and commercial settings.

The cabinet 12 of the appliance 10 is an insulated structure having the insulation cavity 18 defined between the wrapper 14 and the liner 16. Similarly, the insulated doors 50 are insulated structures each having an insulation cavity 52 defined between a door wrapper 54 coupled to a door liner 56. Each of the insulation cavities 18, 52 of the cabinet 12 and insulated doors 50 typically includes one or more insulation materials 58 disposed therein. It is generally contemplated that the insulation materials 58 may be glass-type materials, carbon-based powders, silicon oxide-based materials, silica-based materials, insulating gasses, and other standard insulation materials 58 known in the art. The insulation materials 58 substantially fill the insulation cavity 18, forming a substantially continuous layer between the wrapper 14 and the liner 16. Similarly, the insulation materials 58 substantially fill the insulation cavity 52, forming a substantially continuous layer between the door wrapper 54 and the door liner 56, for one or both doors. The insulation cavities 18, 52 are filled with the insulation materials 58 using a load port on the cabinet 12 and the insulated doors 50, respectively. The cabinet 12 and the insulated doors 50 each define an evacuation port for applying a vacuum or negative pressure to the insulation cavities 18, 52.

Figure 3:
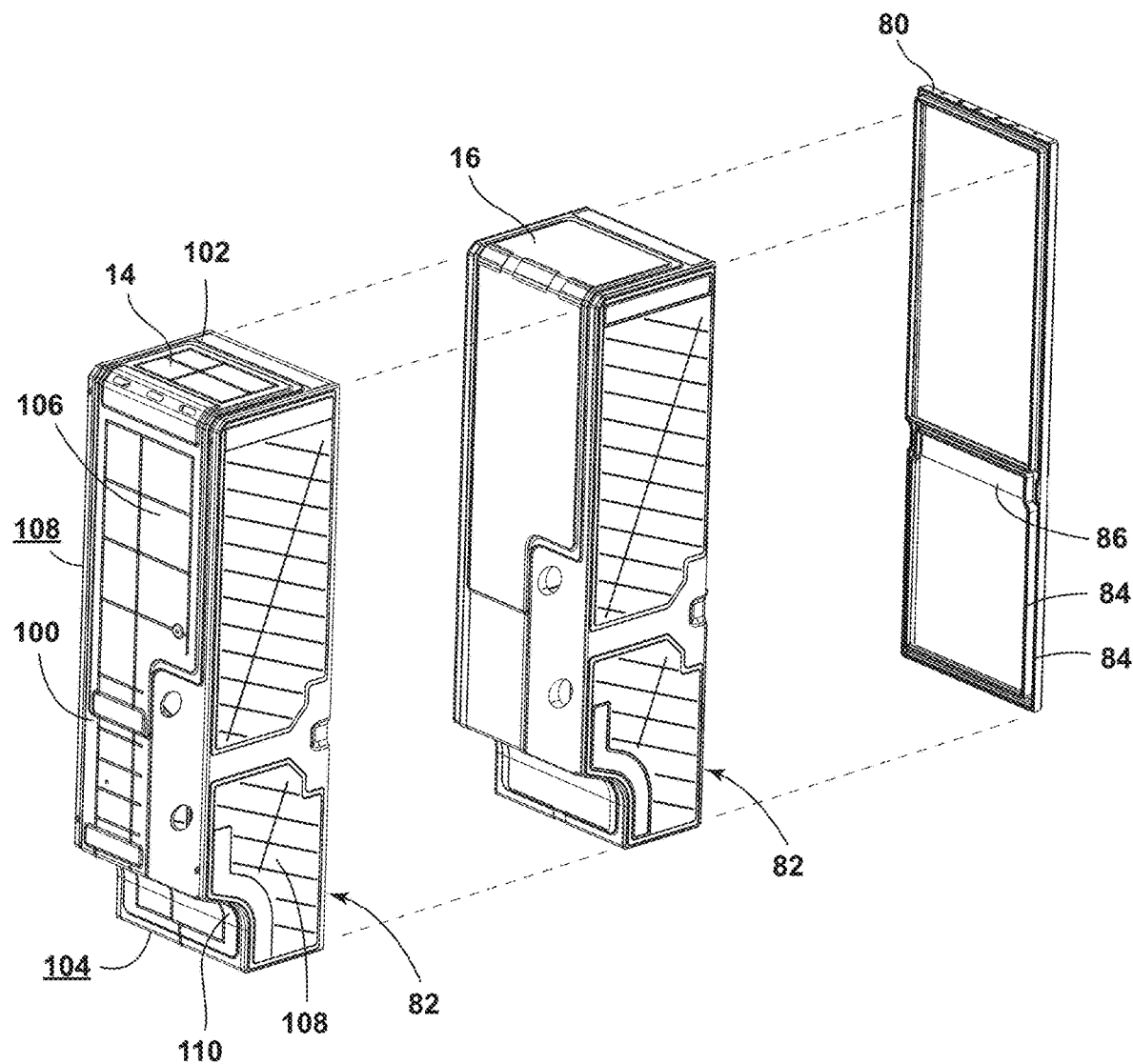
FIG. 3 is an exploded side perspective view of a cabinet for a refrigeration appliance with a wrapper, a liner, and a trim breaker, according to the present disclosure.

Referring still to FIGS. 1-3, an at least partial vacuum 70 is defined within the insulation cavities 18, 52, forming the cabinet 12 and the doors 50 as vacuum insulated structures. The at least partial vacuum 70 defines a pressure differential 72 between an exterior 74 of the cabinet 12 and the insulation cavity 18. The pressure differential 72 serves to define the inward compressive force that is exerted on both the wrapper 14 and the liner 16 and tends to bias the wrapper 14 and the liner 16 toward the insulation cavity 18. The pressure differential 72 and the inward compressive force are also exerted on both the door wrappers 54 and the door liners 56 of the insulated doors 50 and tend to bias the door wrappers 54 and the door liners 56 towards the insulation cavity 52, respectively, in a similar manner.

The outer wrapper 14, the door wrapper 54, the inner liner 16, and the door liner 56 are made from a material at least partially resistant to bending, deformation, or otherwise being deformed in response to an inward compressive force. These materials for the wrapper 14, the door wrapper 54, the liner 16, and the door liner 56 include, but are not limited to, metals, polymers, metal alloys, combinations thereof, and/or other similar substantially rigid materials that can be used for vacuum insulated appliances and structures.

Figure 4:
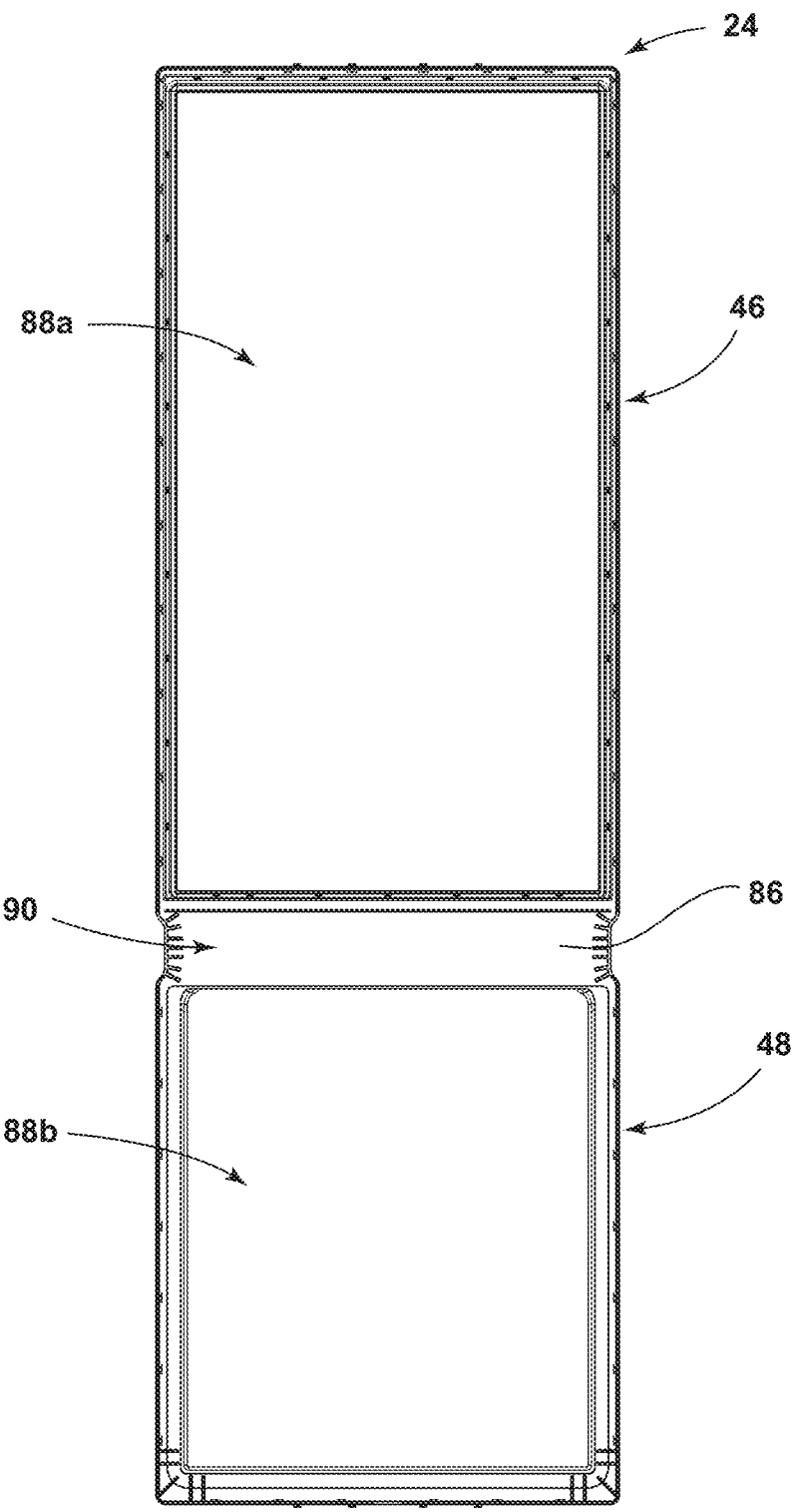
FIG. 4 is a front elevational view of the trim breaker of FIG. 3, according to the present disclosure.

Referring still to FIG. 3, as well as FIG. 4, the wrapper 14 and the liner 16 may be coupled together using a trim breaker 80. The trim breaker 80 may be coupled to outer edges 82 of the wrapper 14 and/or the liner 16. Generally, the trim breaker 80 is coupled to the outer edges 82 of both the wrapper 14 and the liner 16 to define the insulation cavity 18 therebetween. The trim breaker 80 has a generally rectangular shape, however, it is contemplated that other geometric shapes known in the art may be used. In this way, the trim breaker 80 may not substantially interfere with access to the refrigerator and freezer compartments 46, 48 defined by the cabinet 12.

At least one channel 84 may be defined around a perimeter of the trim breaker 80. The channel 84 may be configured to receive the outer edges 82 of the wrapper 14 and/or the liner 16. It is also contemplated that the trim breaker 80 may define more than one channel 84 to accommodate the wrapper 14 and the liner 16 in separate channels 84. The channels 84 may be filled with an adhesive, such as, for example, an epoxy. The adhesive is configured to couple the wrapper 14 and/or the liner 16 with the trim breaker 80 and seal the insulation cavity 18.

The trim breaker 80 includes a cross member 86 to define apertures 88a, 88b corresponding to the refrigerator and freezer compartments 46, 48 of the appliance 10. The channels 84 defined by the trim breaker 80 may extend around the perimeter of the trim breaker 80 as well as along the cross member 86. The cross member 86 defines a mullion region 90 between the refrigerator and freezer compartments 46, 48.

Figure 5:
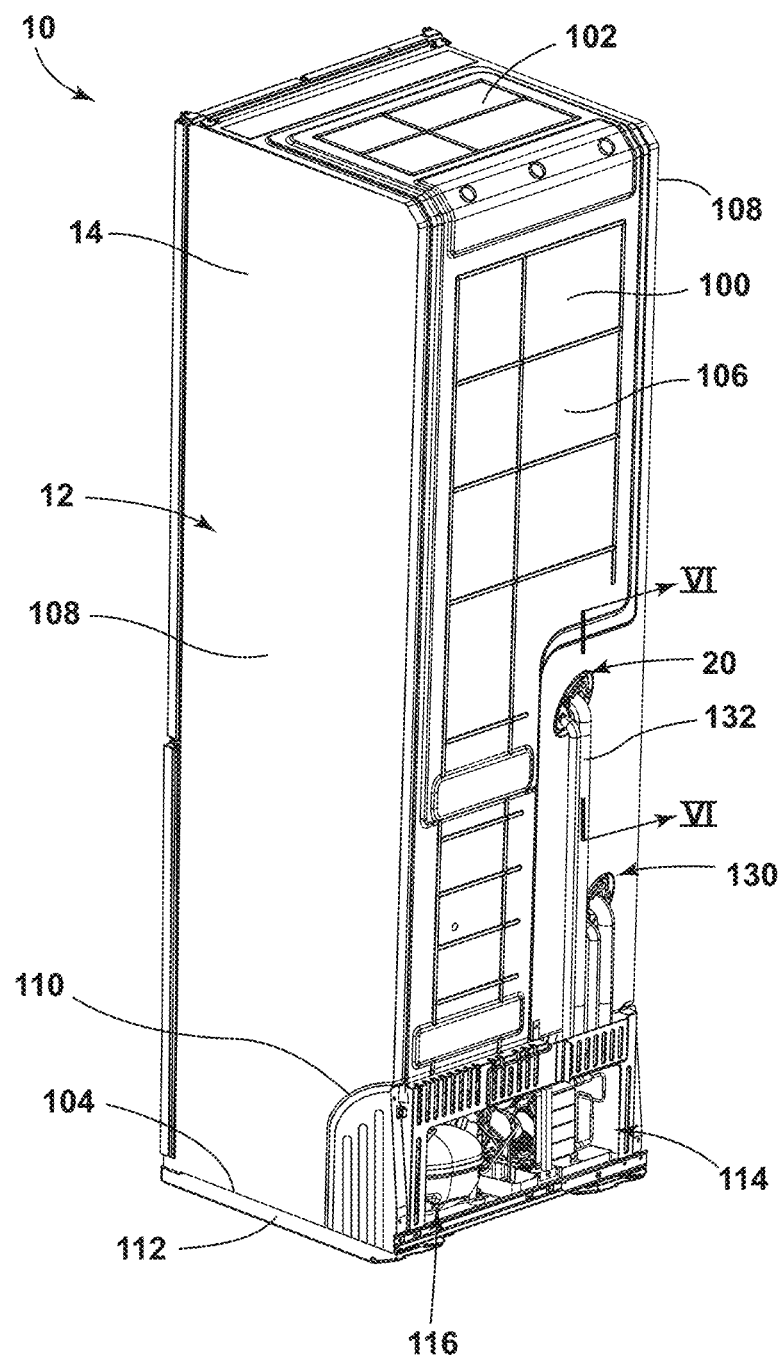
FIG. 5 is a side perspective view of a refrigeration appliance with passthroughs and service connections extending from a machine compartment and through the passthroughs, according to the present disclosure.

Referring to FIGS. 3 and 5, the wrapper 14 has a plurality of walls 100, which may include a top wall 102, a bottom wall 104, a rear wall 106, a pair of side walls 108, and a curved wall 110. The bottom wall 104 of the wrapper 14 may be coupled to a base 112. The curved wall 110 of the wrapper 14 and the base 112 at least partially defines a mechanical compartment 114. The liner 16 can generally have a similar shape as the wrapper 14 to fit within the wrapper 14 and form the cabinet 12. The wrapper 14 and the liner 16 may collectively be referred to as a structural wrapper defining the insulation cavity 18. Various appliance components 116 can be positioned on the base 112 within the mechanical compartment 114 below the rear wall 106 and proximate to the curved wall 110 of the wrapper 14. The appliance components 116 positioned within the mechanical compartment 114 may include components of a refrigerant system, which may include a compressor, a condenser, and/or portions of an evaporator assembly. The appliance components 116 may also include a controller, electronics, or other components for operation of the appliance 10.

Figure 6:
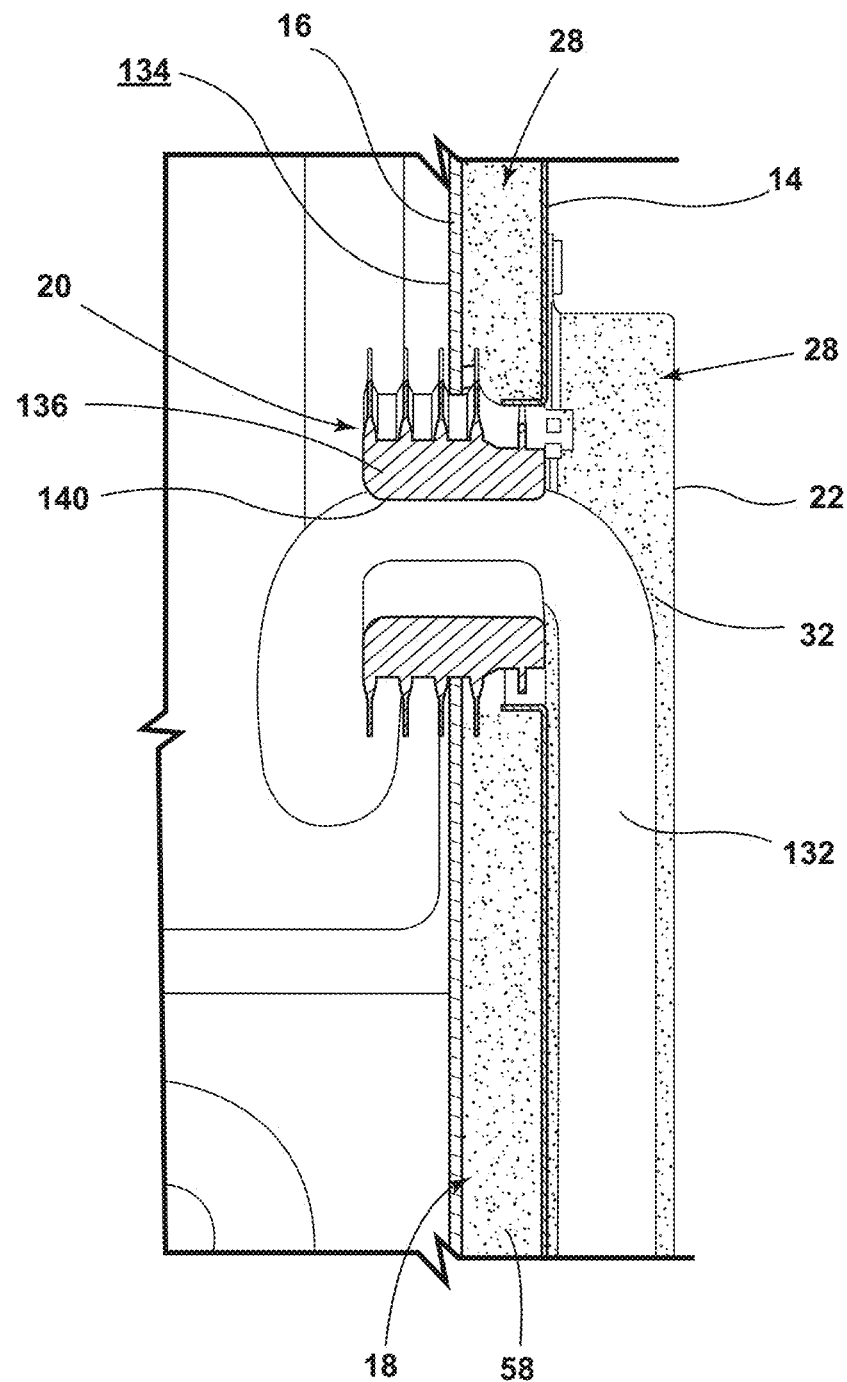
FIG. 6 is a partial cross-section of the refrigeration appliance of FIG. 5 taken along VI-VI, illustrating a service connection extending through one of the passthroughs, according to the present disclosure.
Figure 7:
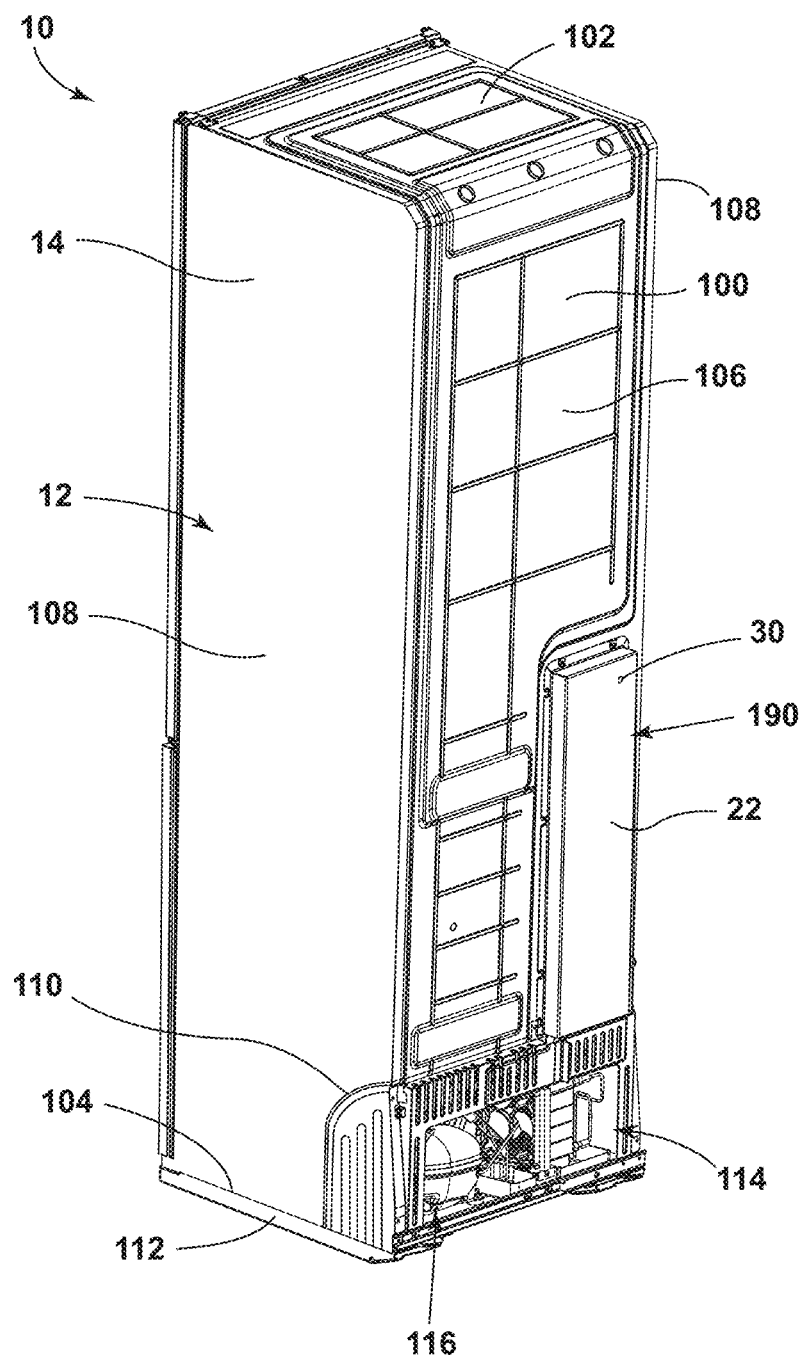
FIG. 7 is a side perspective view of a refrigeration appliance with a passthrough cover, according to the present disclosure.
Figure 8:
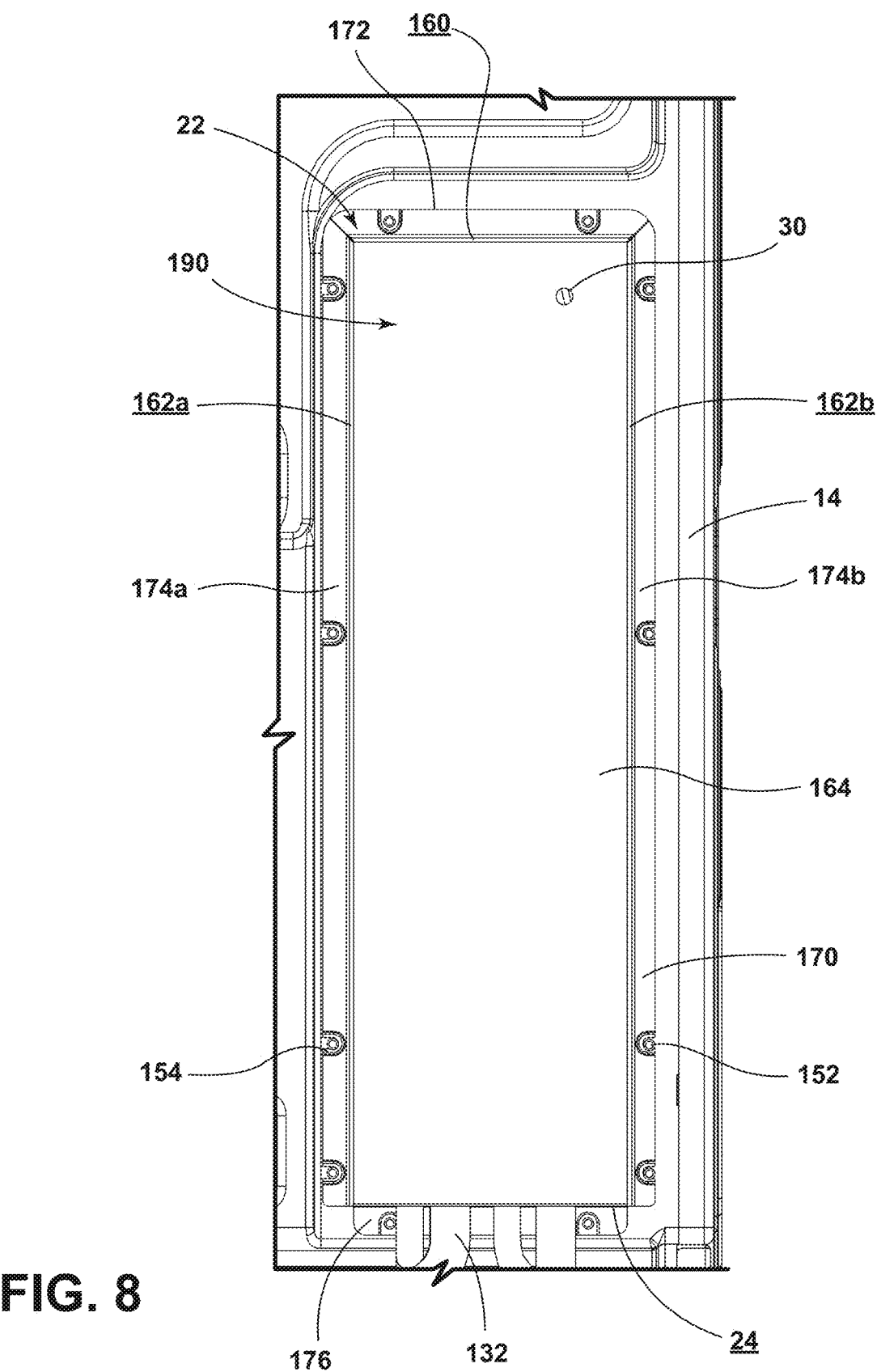
FIG. 8 is a rear elevational view of a passthrough cover coupled to a cabinet of a refrigeration appliance, according to the present disclosure.

Referring to still to FIGS. 3 and 5, and now also FIG. 6, the passthrough opening 20, also referred to as the first passthrough 20, and a second passthrough opening 130, also referred to as a second passthrough 130, are defined by the wrapper 14 and the liner 16 to provide a passage for a service connection 132, or a plurality of service connections 132, which may include service connections 132a-132d, which can collectively be referred to as the service connections 132 or at least one service connection 132. The wrapper 14 and the liner 16 each define apertures that align with one another to form the first and second passthroughs 20, 130. The service connections 132 may be electrical, fluid, refrigerant system, and/or other appliance connections between the refrigerator and freezer compartments 46, 48 and outside the cabinet 12. For example, the service connections 132 may include a suction tube, a drain tube, and a wiring harness.

The first passthrough 20 and second passthrough 130 generally provide passages to the refrigeration compartment 46 and the freezer compartment 48, respectively, through the insulation cavity 18 for the service connections 132. The first passthrough 20 and the second passthrough 130 may be defined through the rear wall 106 of the wrapper 14 and a rear wall 134 of the liner 16. The first passthrough 20 generally includes a first grommet or seal 136 disposed therein, and the second passthrough 130 generally includes a second grommet or seal 138 disposed therein. The first and second grommets 136, 138 may couple to the wrapper 14 and the liner 16. The first and second grommets 136, 138 are configured to maintain the vacuum 70 within the insulation cavity 18 while allowing for the service connection 132 to be routed therethrough. In other words, the grommets 136, 138 provide a seal to maintain the vacuum 70 in the insulation cavity 18, while allowing the service connection 132 to extend from the machine compartment 114 outside the cabinet 12, through the cabinet 12, and into the respective compartment 46, 48 without substantially effecting the vacuum insulation of the cabinet 12.

Referring again to FIG. 2, the first and second grommets 136, 138 may each include connection apertures 140. The connection apertures 140 are configured to allow the service connections 132 to be routed through the first and second grommets 136, 138 and, consequently, the first and second passthroughs 20, 130. The connection apertures 140 may be configured to have a similar diameter and shape the service connections 132. The connection apertures 140 and the grommets 136, 138 are generally configured to reduce or minimize air intrusion into the compartments 46, 48 through the passthroughs 20, 130. The first and second grommets 136, 138 may also be configured to reduce or prevent intrusion of the expanding foam 32 into the compartments 46, 48 by minimizing a gap between the service connections 132 and a perimeter of the respective connection apertures 140. The first and second grommets 136, 138 may be constructed of a rubber or plastic material that allows for the partial vacuum 70 to be maintained in the insulation cavity 18. The first and second grommets 136, 138 are constructed of a material that generally minimizes or prevents air intrusion through the material of construction (e.g., an air-impermeable material), thereby helping maintain the vacuum 70 in the insulation cavity 18.

Referring to FIGS. 6-9, the passthrough cover 22 is coupled to the cabinet 12 over the first passthrough 20 and the second passthrough 130. More specifically, the passthrough cover 22 may be coupled to the rear wall 106 of the wrapper 14. The passthrough cover 22 and the cabinet 12 define the cavity 28 therebetween. In this way, the cavity 28 is defined between the rear wall 106 of the wrapper 14 and a plurality of walls 150 of the passthrough cover 22. The passthrough cover 22 is generally coupled to the cabinet 12 using a plurality of fasteners 152 coupled to the wrapper 14 and a plurality of apertures 154 defined by the passthrough cover 22. The fasteners 152 may include mounting studs, threaded studs, or other fasteners coupled to the rear wall 106 of the wrapper 14 that allow for the partial vacuum 70 to be maintained within the insulation cavity 18. The fasteners 152 may be attached to the wrapper 14 using adhesives, by welding, or other methods allowing for the partial vacuum 70 to be maintained within the insulation cavity 18.

The apertures 154 defined by the passthrough cover 22 may be slots 154a or holes 154b that interface with, attach to, or couple to the fasteners 152, thus coupling the passthrough cover 22 to the cabinet 12. The fasteners 152 and the apertures 154 may be configured to minimize a gap between the passthrough cover 22 and the wrapper 14. The minimized gap may assist in preventing the expanding foam 32 from expanding or leaking through the gap or outside of the cavity 28 and assist the expanding foam 32 in at least partially filling the cavity 28, as discussed further herein. The passthrough cover 22 is not limited to being coupled to the cabinet 12 with the fasteners 152 engaging the apertures 154 and may be coupled in other manners, such as brackets, welding, or adhesives, that allow for the partial vacuum 70 to be maintained within the insulation cavity 18.

Figure 9:
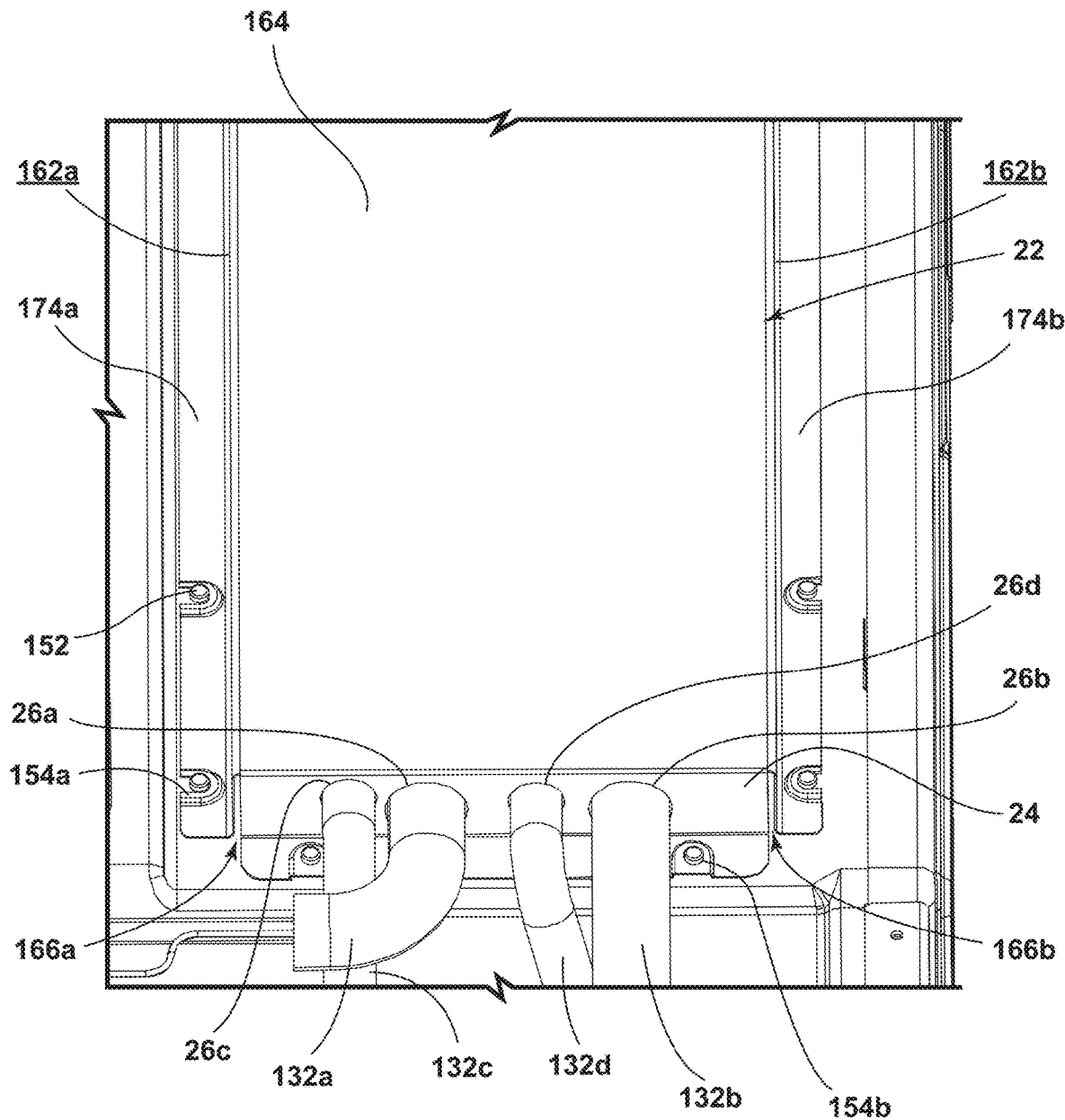
FIG. 9 is a partial bottom perspective view of a passthrough cover coupled to a refrigeration appliance with service connections extending through the passthrough cover, according to the present disclosure.

Referring still to FIGS. 6 and 9, the service connections 132 are routed through the service holes 26 defined by the bottom wall 24 of the passthrough cover 22. While the first passthrough 20 is illustrated in FIG. 6, the second passthrough 130 allows the service connections 132 to be routed in the same or similar manner as the service connections 132 are routed to the first passthrough 20. In the illustrated configuration, the plurality of service holes 26 includes four service holes 26a-26d, and the plurality of service connections 132 includes four service connections 132a-132d. Each of the service holes 26 may correspond to one of the service connections 132. In this way, there is generally one service connection 132 extending through each service hole 26, which may reduce a gap between an outer periphery of the service connections 132 and the bottom wall 24 of the passthrough cover 22. However, multiple service connections 132 may also be routed through a single service hole 26 without departing from the teachings herein.

The service holes 26 may each have a similar diameter or size as the corresponding service connection 132 to have a reduced gap therebetween. The gap between the service hole 26 and the respective service connection 132 may also be configured to allow for expansion of the expanding foam 32, as discussed further herein. The service connections 132 are routed through the cavity 28 between the wrapper 14 and the passthrough cover 22, and to the respective passthrough 20, 130. The service connections 132 may be spaced from the rear wall 106 of the wrapper 14 allowing for the expanding foam 32 to expand therebetween, as discussed further herein.

For example, the first service connection 132a and the second service connection 132b may be routed from the mechanical compartment 114 and through the first service hole 26a and the second service hole 26b, respectively. The first service connection 132a may be routed from the first service hole 26a, through the cavity 28, through the first passthrough 20, and to the first compartment 46 of the appliance 10. The second service connection 132b may be routed from the second service hole 26b, through the cavity, through the second passthrough 130, and to the second compartment 48 of the appliance 10. The first and second service connections 132a, 132b may also be routed from the respective first and second service holes 26a, 26b, respectively, and together routed through the first passthrough 20 or the second passthrough 130.

The service holes 26 are not limited to the arrangements depicted and may be arranged in various configurations. The service holes 26 may be defined in any of the plurality of walls 150 of the passthrough cover 22. For example, the plurality of service holes 26 may include the first service hole 26a, the second service hole 26b, the third service hole 26c, and the fourth service hole 26d. The plurality of service connections 132 may include the first service connection 132a, the second service connection 132b, the third service connection 132c, and the fourth service connection 132d, which may be routed through respective service holes 26a-26d. The first and third service connections 132a, 132c may be routed to and through the first passthrough 20 and to the refrigerator compartment 46. The second and fourth service connections 132b, 132d may be routed to and through the second passthrough 130, and to the freezer compartment 48.

Figures 10A, 10B:
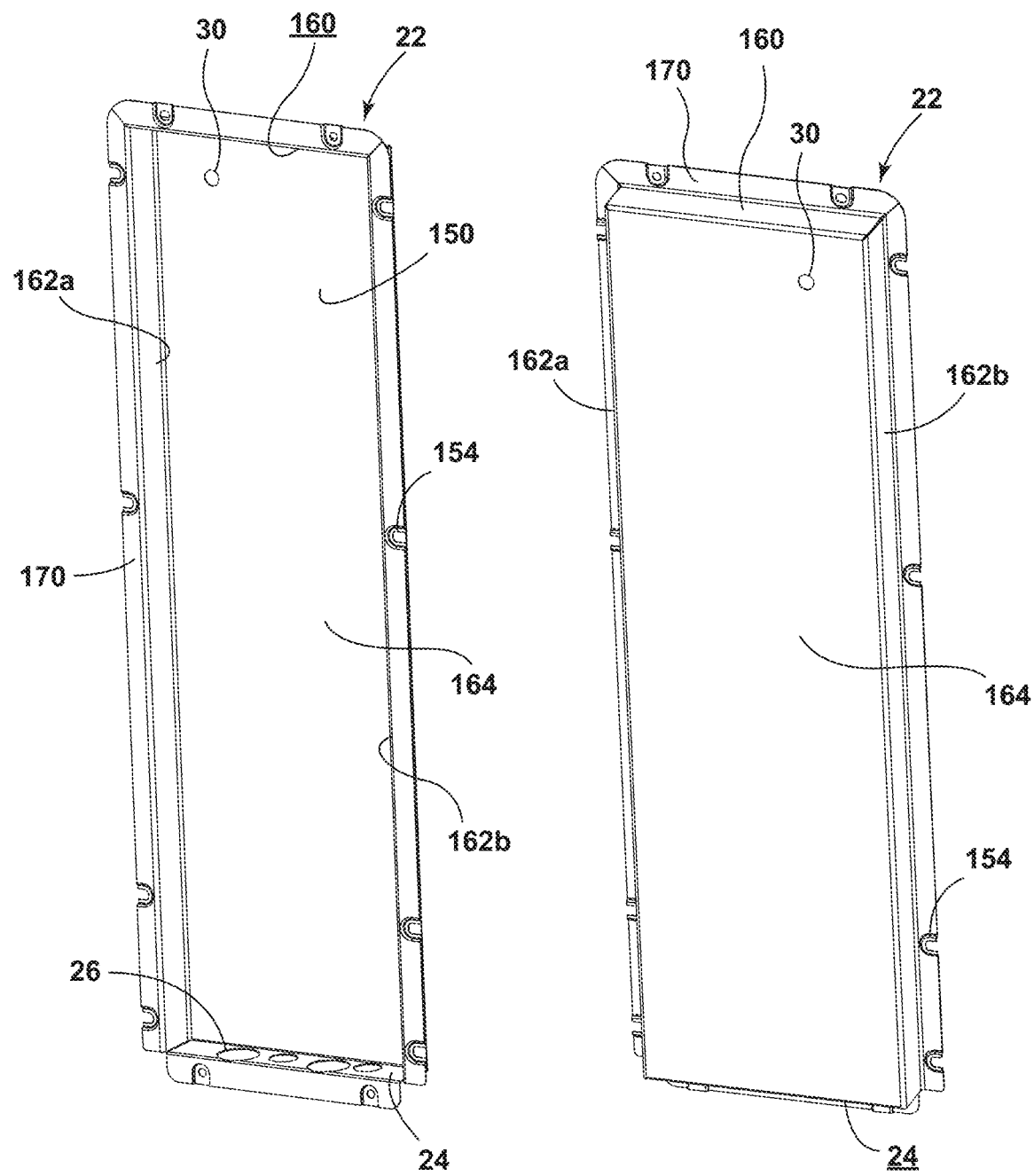
FIG. 10A is a side perspective view of a passthrough cover, according to the present disclosure.
FIG. 10B is a side perspective view of a passthrough cover, according to the present disclosure.

Referring to FIGS. 10A and 10B, the passthrough cover 22 has the plurality of walls 150, including a top wall 160, a first side wall 162a, a second side wall 162b, a back wall 164, and the bottom wall 24. When the passthrough cover 22 is coupled to the rear wall 106 of the wrapper 14, the back wall 164 may generally extend parallel to the rear wall 106. The top wall 160, the first and second side walls 162a, 162a, and the bottom wall 24 may generally extend perpendicular to the rear wall 106 of the wrapper 14 when coupled thereto. Thus, the top wall 160 and the bottom wall 24 may generally extend parallel to each other and perpendicular to the back wall 164. Further, the back wall 164 is spaced from the rear wall 106 of the wrapper 16 by the top wall 160, the first and second side walls 162a, 162a, and the bottom wall 24 to define and enclose the cavity 28.

The passthrough cover 22 may define a pair of slots 166a, 166b proximate to the bottom wall 24. As illustrated, the slots 166a, 166b are defined by the bottom wall 24 and the first and second side walls 162a, 162b, respectively. In the illustrated configuration, the first slot 166a is defined between the bottom wall 24 and the first side wall 162a, and the second slot 166b is defined between the bottom wall 24 and the second side wall 162b. However, the pair of slots 166a, 166b may be defined by one or any combination of the bottom wall 24, the first side wall 162a, and the second side wall 162b. In various implementations, the passthrough cover 22 may include the first slot 166a with the second slot 166b being omitted, the second slot 166b with the first slot 166a omitted, or may include additional slots. The slots 166a, 166b may also be defined in different locations without departing from the teachings herein. The pair of slots 166a, 166b generally allow for expansion of the expanding foam 32 therethrough and may assist in preventing the cavity 28 from being overfilled. The slots 166a, 166b are also advantageous as gravity draws the expanding foam 32 toward the bottom of the cavity 28 and allows the expanding foam 32 to expand through the slots 166a, 166b.

The passthrough cover 22 may include a plurality of flanges 170 extending from the plurality of walls 150. As illustrated, a top flange 172 extends from the top wall 160, a first side flange 174a extends from the first side wall 162a, a second side flange 174b extends from the second side wall 162b, and a bottom flange extends 176 from the bottom wall 24. The flanges 170 may define the apertures 154 used to couple the passthrough cover 22 to the rear wall 106 of the wrapper 14, forming an outer perimeter that can assist in sealing the cavity 28. In the illustrated example, the first side flange 174a and the second side flange 174b each define slots 154a, and the top flange 172 and the bottom flange 176 each define holes 154b.

The injection ports 30 are generally defined by the back wall of the passthrough cover 22. As illustrated, the passthrough cover 22 includes one foam injection port 30 defined on an upper portion 190 of the back wall 164 of the passthrough cover 22. The foam injection port 30 is configured to allow for the expanding foam 32 to be injected into the cavity 28 when the passthrough cover 22 is coupled to the rear wall 106 of the cabinet 12. The foam injection port 30 may also be configured to allow for the expanding foam 32 to expand therethrough, as discussed herein. The injection port 30 is located or defined on the passthrough cover 22 to allow for the expanding foam 32 to at least partially fill the cavity 28. The injection port may also be configured such that the expanding foam 32 at least partially surrounds the service connections 132 routed through the cavity 28. The passthrough cover 22 may include the plurality of injection ports 30 spaced across the back wall 164 to assist with partially, substantially, or completely filling the cavity 28.

The passthrough cover 22 may be made from a material at least partially resistant to bending, deformation, or otherwise being deformed in response to a compressive or expansive force, such as those that may be applied by the foam 32 expanding in the cavity 28. These materials for the passthrough cover 22 may include, but are not limited to, metals, polymers, metal alloys, combinations thereof, and/or other similar substantially rigid materials.

Referring again to FIG. 6 and to FIGS. 11-15, the expanding foam 32 is generally a foam that expands to fill a volume and subsequently is cured or is curable. The expanding foam 32 may have a cured state and an uncured state. In the cured state the foam 32 is set as a solid or a semi-solid, and a curing process has been substantially completed (i.e., the chemical reaction has completed or reached an equilibrium). In the uncured state, the foam is a liquid, a fluid, or a semi-solid that can be formed to a volume and has not undergone the curing process or has partially undergone the curing process.

The expanding foam 32 may begin a curing process once introduced to an atmosphere or being subject to an activated curing process, such as using light (i.e., ultraviolet light) or introducing a catalyst. In some implementations, the expanding foam 32 may be a two-part mix where the curing process and expansion process begin when a first component and a second component are mixed, causing a chemical reaction to begin. The expanding foam 32 may flow to partially fill a volume, such as the cavity 28, and expand over a period of time to substantially or completely fill the volume. The expanding foam 32 may take and retain a shape of the volume in the cured state. The expanding foam 32 may be an open-celled foam or a closed-cell foam. The expanding foam 32 may generally resist conducting heat through the cured structure of the foam 32. Stated differently, the expanding foam 32 may have a high R-value. The expanding foam 32 generally includes at least two components, a polyol resin and an isocyanate. The expanding foam 32 may include polyurethane or be a polyurethane-based expanding foam 32.

Figure 11:
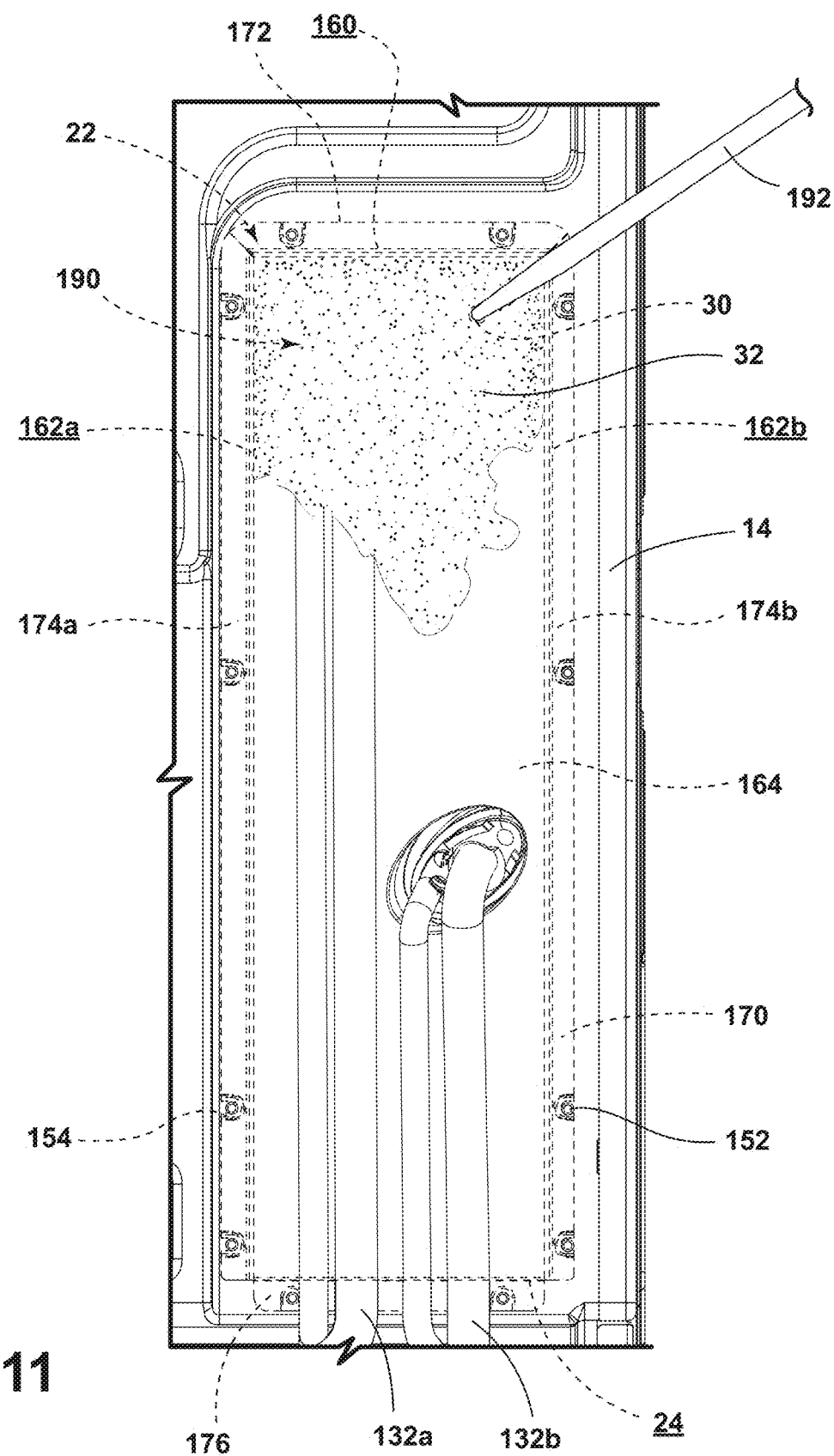
FIG. 11 is a rear elevation view of a passthrough cover coupled to a refrigeration appliance, illustrating an expanding foam being dispensed into a cavity between the passthrough cover and a cabinet of the refrigeration appliance, according to the present disclosure.
Figure 12:
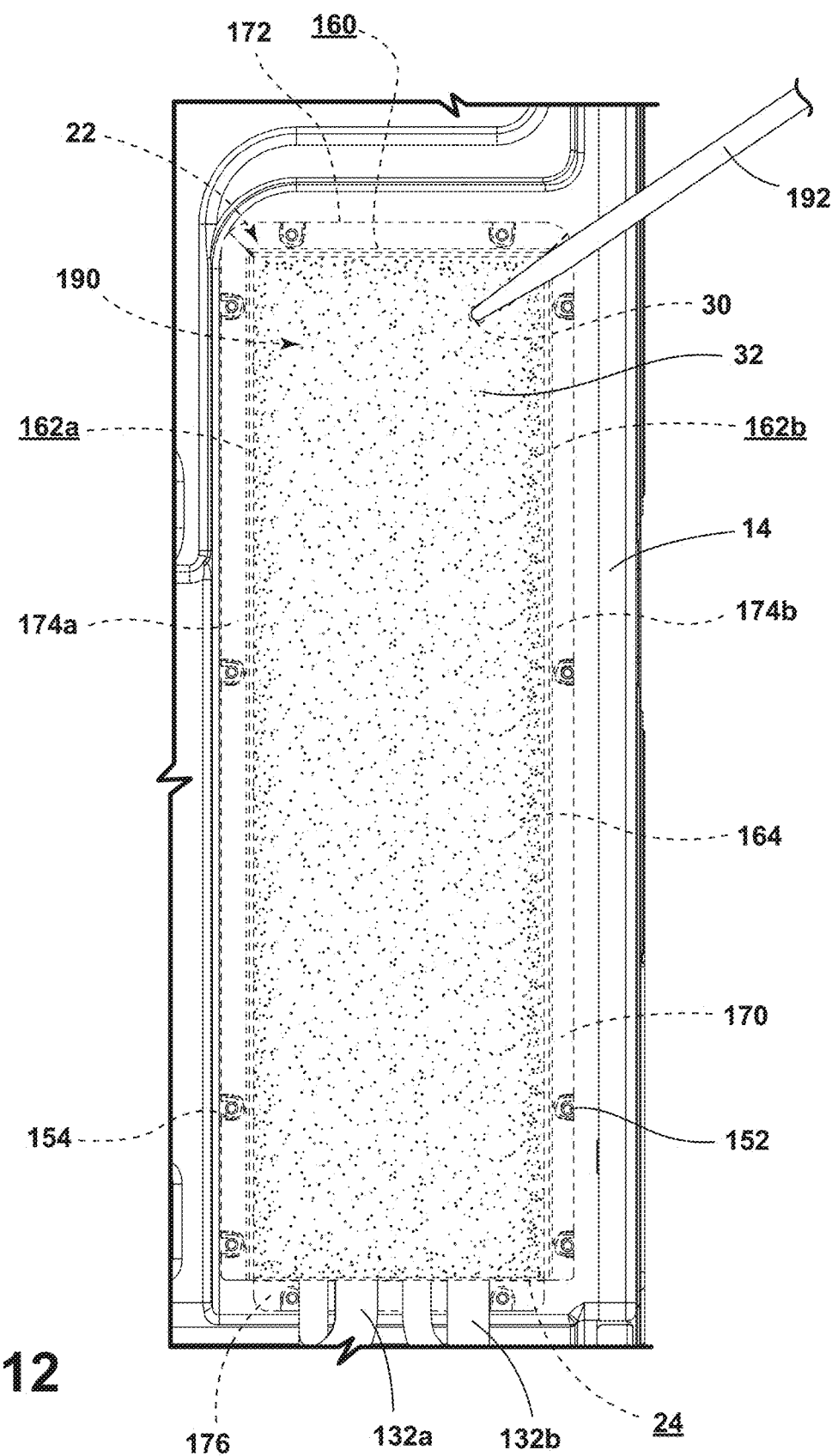
FIG. 12 is a rear elevation view of a passthrough cover coupled to a refrigeration appliance, illustrating a cavity between the passthrough cover and a cabinet of the refrigeration appliance being filled with an expanding foam, according to the present disclosure.

As illustrated in FIGS. 11 and 12, the passthrough cover 22 is shown as having the foam injection port 30 disposed on the upper portion 190 of the back wall 164. A foam injection nozzle 192 is configured to inject the expanding foam 32 through the injection port 30. As shown in FIG. 11, as the foam 32 is injected into the cavity 28, the foam 32 flows and expands away from the injection port 30. As more expanding foam 32 is injected, various components disposed in the cavity 28 between the passthrough cover 22 and the wrapper 14 are covered and surrounded by the expanding foam 32. For example, a portion of the service connection 132, the first passthrough 20, and the first grommet 136 are covered as the expanding foam 32 is being injected. When the injection port 30 is located on the upper portion 190 of the back wall 164, gravity may assist the expanding foam 32 in flowing down the cavity 28 and around the service connections 32. Once a predetermined amount of expanding foam 32 is injected the foam injection nozzle 192 is removed from the injection port 30. The predetermined amount of the expanding foam 32 may partially fill the cavity 28 and cover the first passthrough 20, the first passthrough 20 and the second passthrough 130, the first and second passthroughs 20, 130 and the service connections 132, or any combination of components disposed in the cavity 28. The predetermined amount of expanding foam 32 may also substantially fill or fully fill the cavity 28 without or with expansion through the slots 166a, 166b, the service holes 26, and/or the injection port 30.

Figure 13:
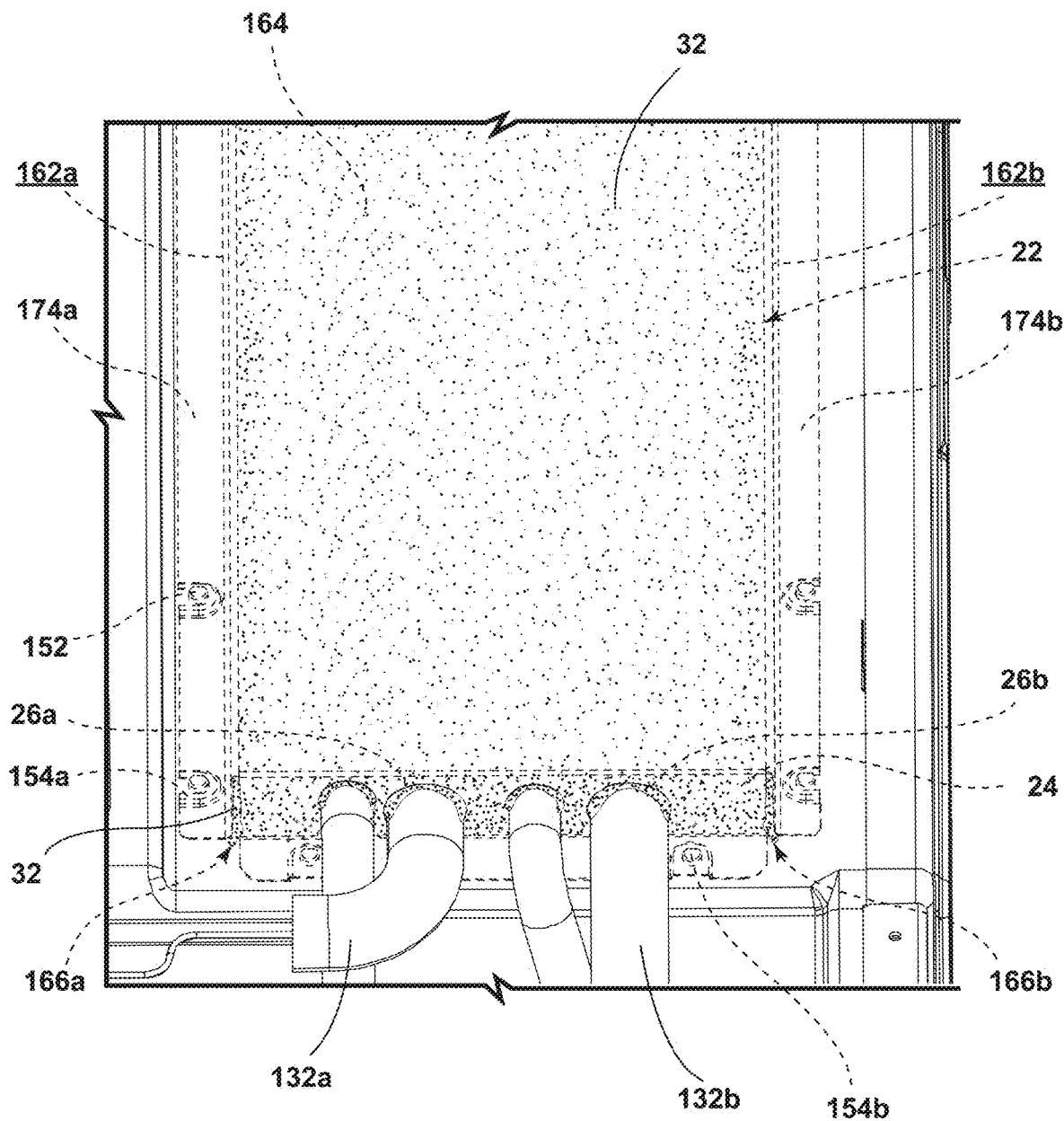
FIG. 13 is a partial bottom perspective view of a passthrough cover coupled to a refrigeration appliance, illustrating a cavity between the passthrough cover and a cabinet of the refrigeration appliance being filled with an expanding foam, according to the present disclosure.

As shown in FIGS. 12 and 13, the expanding foam 32 may substantially or fully fill the cavity 28. As the expanding foam 32 cures and finishes expansion, the service holes 26 and/or the slots 166a, 166b may allow for expansion of the expanding foam 32 therethrough. The expanding foam 32 may also expand through the foam injection ports 30. The expansion of the expanding foam 32 through the service holes 26, the slots 166a, 166b, and/or the injection port 30 may help prevent the expanding foam 32 from warping or further biasing the wrapper 14 toward the insulation cavity 18. The expansion through the service holes 26, the slots 166a, 166b, and/or the injection port 30 may also allow for a larger amount of the expanding foam 32 to be used to substantially or fully fill the cavity 28 to provide for better insulation.

Figure 14:
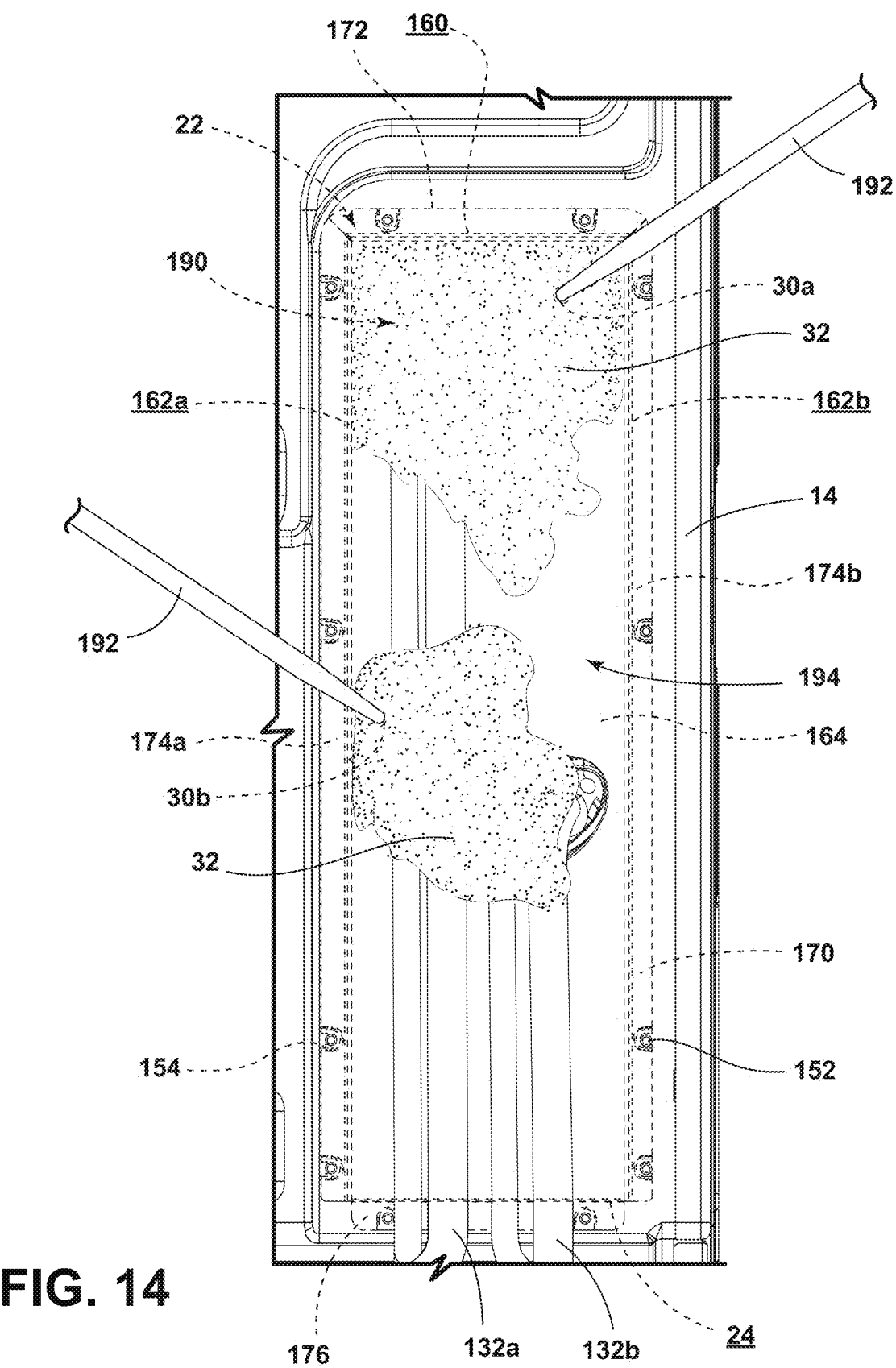
FIG. 14 is a rear elevation view of a passthrough cover coupled to a refrigeration appliance, illustrating a cavity between the passthrough cover and a cabinet of the refrigeration appliance being filled with an expanding foam in two locations, according to the present disclosure.
Figure 15:
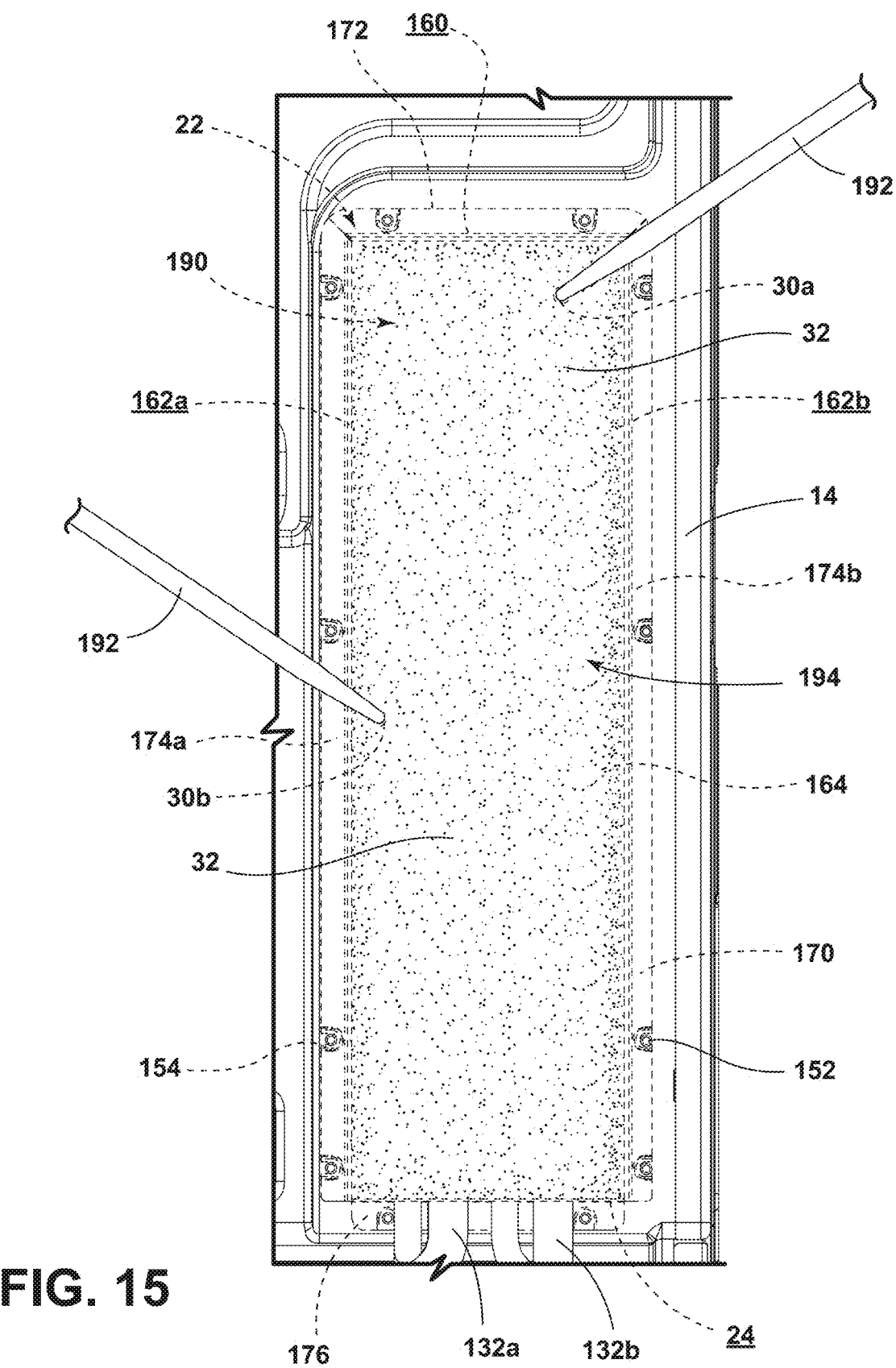
FIG. 15 is a rear elevation view of a passthrough cover coupled to a refrigeration appliance, illustrating a cavity between the passthrough cover and a cabinet of the refrigeration appliance being filled with an expanding foam, according to the present disclosure.

As illustrated in FIGS. 14 and 15, the passthrough cover 22 defines the first and the second injection ports 30a, 30b, and the expanding foam 32 may be injected through the first and second injection ports 30a, 30b using multiple injection nozzles 192. The first injection port 30a is located on the upper portion 190 of the back wall 164 of the passthrough cover 22 and the second injection port 30b is located on a central or mid-portion 194 of the back wall 164 of the passthrough cover 22. The first injection port 30a is also proximate one of the side walls 162b of the passthrough cover 22 and the second injection port 30b is proximate the opposing side wall 162a of the passthrough cover 22. The expanding foam 32 is injected into each of the injection ports 30a, 30b.

As the foam 32 is injected into the cavity 28, the expanding foam 32 covers the various components disposed in the cavity 28. Gravity may assist the expanding foam in flowing down the cavity from both the first and second injection ports 30a, 30b. The expanding foam 32 may substantially or fully fill the cavity 28. As the expanding foam 32 cures and finishes expansion, the service holes 26 and/or the slots 166a, 166b may allow for expansion of the expanding foam 32 therethrough, as discussed herein. In some implementations, including two or more injection ports 30 may be beneficial to assist with filling discrete sections of the cavity 28 that may be separated from other sections of the cavity 28 by the service connections 32 or other components disposed therein. The injection ports 30 may be defined on the back wall 164 of the cover 22 to target specific sections or locations of the cavity 28 and to allow for the expanding foam 32 to fill or cover those sections. The foam 32 and the passthrough cover 22 form a foamed-in passthrough cover assembly to assist with increasing insulation for the appliance 10.

Figure 16:
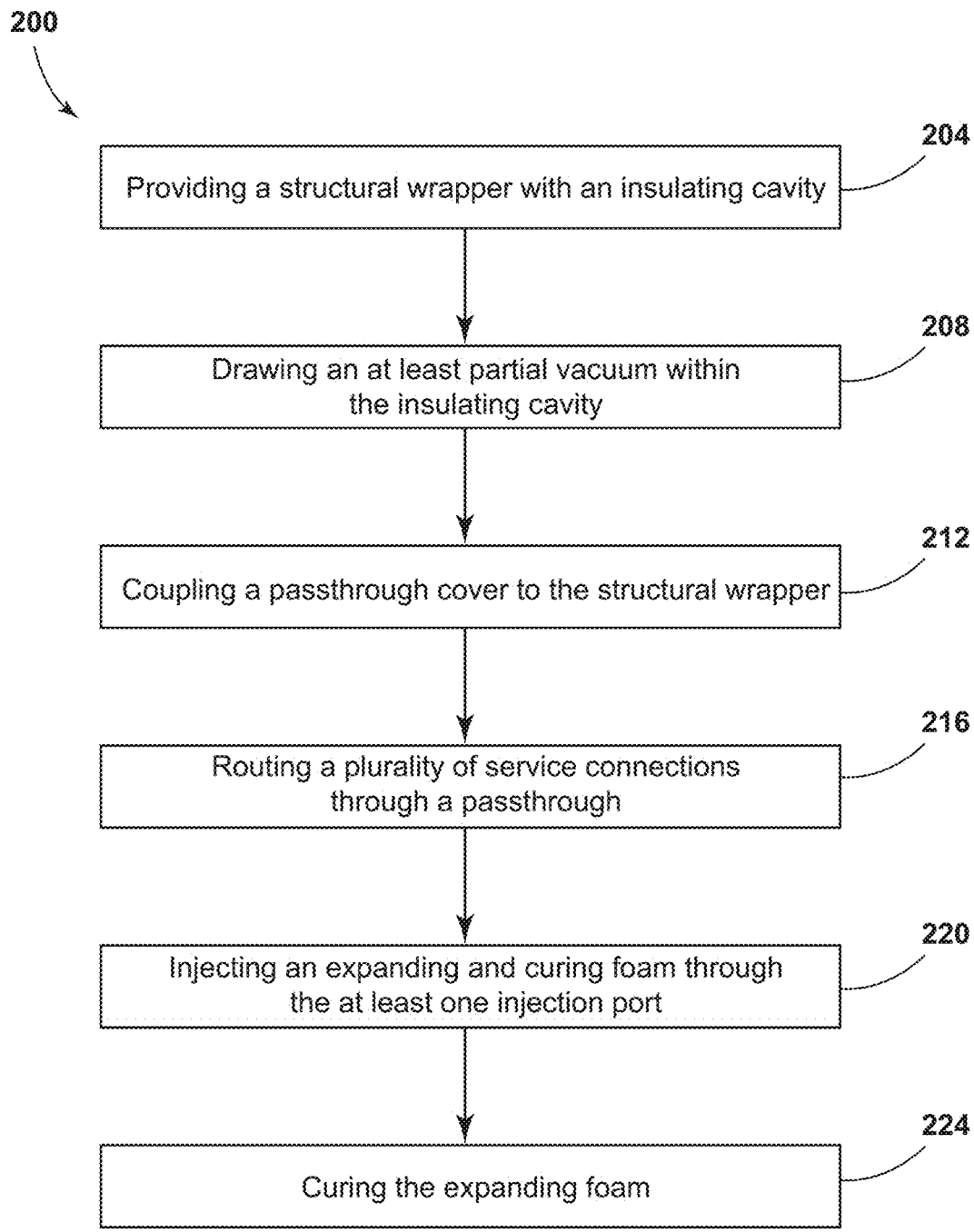
FIG. 16 is a flow diagram of a method of manufacturing a vacuum insulated structure, according to the present disclosure.

Referring to FIG. 16, and with further reference to FIGS. 1-15, a flow diagram of a method 200 for manufacturing the vacuum insulated structure 10 having the passthrough cover 22 is illustrated. The method 200 includes step 204 of providing the structural wrapper with the insulation cavity 18. The structural wrapper may include the outer wrapper 14 coupled to the inner liner 16 and defining the insulation cavity 18 partial vacuum therebetween. The structural wrapper also defines the passthrough 20 or both passthroughs 20, 130. At step 208, the at least partial vacuum 70 is drawn in the insulation cavity 18. The partial vacuum 70 may be a predetermined pressure. In step 212, the plurality of service connections 132 are routed through the passthrough 20. The service connections 132 may be routed along the rear wall 106 of the wrapper 14. The service connections 132 may also be routed through the first grommet 136. In some implementations, the plurality of service connection 132 may be routed through the second passthrough 130 and may also be routed through the second grommet 138.

In step 212, the passthrough cover 22 is coupled to the wrapper 14. The passthrough cover 22 may be coupled to the rear wall 106 of the wrapper 14. Step 216 includes routing the plurality of service connections 132 through the service holes 26, such as the first and second service holes 26a, 26b. In various examples, the first and second service connections 132a, 132b may be routed through the first and second service holes 26a, 26b. The plurality of service connections 132 may be routed to the mechanical compartment 114 from the plurality of service holes 26.

In step 220, the expanding and curing foam 32 is injected through one or more injection ports 30 to substantially fill the foam cavity 28 defined between the wrapper 14 and the passthrough cover 22. Injecting the expanding foam 32 through the injection port 30 generally allows for the expanding foam 32 to substantially fill the cavity 28. The injection port 30 is defined on the rear wall 106 of the passthrough cover 22. The expanding foam 32 may also be injected into the first and second injection ports 30a, 30b or a plurality of injection ports 30. The expanding foam 32 may expand through the slots 166a, 166b. Step 224 may include curing the expanding foam 32 and removing excess expanding foam 32 that expanded through the service holes 26, the slots 166a, 166b, and/or the injection ports 30. The steps of the method 200 may be performed simultaneously or concurrently, may be omitted or repeated, and may be performed in any order without departing from the teachings herein.

Use of the present device may provide a variety of advantages. For example, the passthrough cover 22 with the foam injection port 30 may decrease manufacturing time of the vacuum insulated structure 10, thereby increasing efficiency of the manufacturing process. Other conventional insulations are generally required to be molded or fitted to the various components located in the cavity. Further, the expanding foam 32 can provide greater insulation due to the high resistance to heat transfer. The insulation of the expanding foam 32 may reduce heat exchange through the passthroughs 20, 130. The expanding foam may also provide insulation to the service connections 132 and reduce heat exchange from the local environment and the service connections 132 and between the service connections 132. For example, this may increase the efficiency of a refrigeration system by preventing heat transfer before an evaporator. Additionally, the insulation property of the expanding foam 32 may allow for the cavity 28 to have a smaller volume than utilized with conventional insulation, thereby using less space than the conventional insulations. Furthermore, the expanding foam 32 also is able to expand and fill any air gaps within the cavity 28 defined by the passthrough cover 22 and the wrapper 14, providing greater insulation. Moreover, the service holes 26 and/or the slots 166a, 166b may reduce or prevent bowing or biasing of the wrapper 14 toward the insulation cavity 18 to not substantially affect the insulation of the cabinet 12 by allowing the foam 32 to expand therethrough. Additional benefits or advantages may be realized and/or achieved.

The device disclosed herein is further summarized in the following paragraphs and is further characterized by combinations of any and all of the various aspects described herein.

According to an aspect of the present disclosure, a vacuum insulated appliance includes a cabinet including an outer wrapper and an inner liner coupled to the outer wrapper to define an insulation cavity. The cabinet defines a passthrough opening through the outer wrapper and the inner liner. A passthrough cover is coupled to the cabinet over the passthrough opening. The passthrough cover has a bottom wall defining at least one service hole. A passthrough cavity is defined between the cabinet and the passthrough cover. At least one foam injection port is defined by the passthrough cover, and an expanding foam is disposed within the passthrough cavity. The expanding foam is configured to be inserted through the at least one foam injection port to at least partially fill the passthrough cavity.

According to another aspect, a passthrough cover includes a back wall spaced from an outer wrapper by a pair of side walls extending from the back wall to the outer wrapper. At least one foam injection port is defined on the back wall of the passthrough cover.

According to yet another aspect, at least one foam injection port includes a first foam injection port and a second foam injection port. The first injection port is defined on an upper portion of a back wall of a passthrough cover and the second foam injection port is defined on a mid-portion of the back wall of the passthrough cover.

According to another aspect, a passthrough cover includes a pair of sidewalls extending from the back wall. The passthrough cover includes the pair of slots, respectively, defined by a bottom wall and a pair of side walls for expansion of an expanding foam.

According to yet another aspect, a service connection is routed through at least one service hole, through a passthrough cavity, and through a passthrough opening. An expanding foam at least partially fills the passthrough cavity around a service connector.

According to another aspect, an expanding foam is a polyurethane-based expanding foam.

According to yet another aspect, a vacuum insulated appliance includes first and second service connections, where at least one service hole includes a first service hole and a second service hole. The first service connection is routed through the first service hole and the second service connection is routed through the second service hole, each of the first service connection and the second service connection extending through a passthrough opening.

According to another aspect, a vacuum insulated appliance includes first and second service connections, where a cabinet defines a second passthrough opening through an outer wrapper and an inner liner. At least one service hole includes a first service hole and a second service. The first service connection is routed through the first service hole and the second service connection is routed through a second service hole.

According to yet another aspect, a cabinet defines a first compartment and a second compartment. A passthrough opening defines a passage from outside a cabinet to the first compartment and a second passthrough opening defines a passage from outside the cabinet to a second compartment.

According to another aspect of the present disclosure, a vacuum insulated assembly includes a vacuum insulated structure having a structural wrapper defining an insulation cavity, where an at least partial vacuum is defined in the insulation cavity. A passthrough opening is defined through the vacuum insulated structure. A passthrough cover is coupled to the vacuum insulated structure over the passthrough opening. The passthrough cover has a bottom wall defining a service hole. A foam injection port is defined by the passthrough cover. A foam cavity is at least partially defined between the structural wrapper and the passthrough cover. An expanding foam at least partially fills the foam cavity. The foam injection port is configured to allow the injection of the expanding foam in the foam cavity.

According to another aspect, the passthrough cover includes a pair of sidewalls extending from the back wall. The passthrough cover includes a pair of slots defined by a bottom wall and the pair of side walls, respectively, for expansion of an expanding foam.

According to yet another aspect, a grommet is coupled to a vacuum insulated structure in a passthrough opening to maintain an at least partial vacuum in an insulation cavity.

According to another aspect, a foam injection port is defined on an upper portion of a back wall of a passthrough cover.

According to yet another aspect, a service connection is routed through a service hole, through a foam cavity, and through a passthrough opening. The expanding foam at least partially surrounds the service connection.

According to yet another aspect of the present disclosure, a method for manufacturing a vacuum insulated structure includes providing a structural wrapper with an insulation cavity, the structural wrapper defining a passthrough opening, drawing an at least partial vacuum within the insulation cavity, and routing a plurality of service connections through the passthrough opening. The method further includes coupling a passthrough cover to the structural wrapper over the passthrough opening, routing the plurality of service connectors through the plurality of service holes defined by a bottom wall of the passthrough cover, and injecting an expanding and curing foam through at least one injection port of the passthrough cover to at least partially fill a foam cavity defined between the structural wrapper and the passthrough cover around the plurality of service connectors. The at least one injection port is defined on a back wall of the passthrough cover.

According to another aspect, an expanding and curing foam is a polyurethane-based expanding and curing foam.

According to yet another aspect, a step of injecting an expanding and curing foam includes the expanding and curing foam expanding through a pair of slots defined by a bottom wall and a pair of side walls, respectively, of the passthrough cover.

According to another aspect, a method includes routing a first service connection of a plurality of service connections through a passthrough opening to a first compartment defined by a structural wrapper, and routing a second service connection of the plurality of service connections through a second passthrough opening defined by the structural wrapper to a second compartment defined by the structural wrapper.

According to yet another aspect, a method includes routing a first service connection through a first service hole of a plurality of service holes to a mechanical compartment defined by a structural wrapper, and routing the second service connection through a second service hole of the plurality of service holes to the mechanical compartment.

According to another aspect, at least one injection port includes a first injection port and a second injection port. A step of injecting the expanding and curing foam includes injecting the expanding and curing foam through the first injection port, and injecting the expanding and curing through the second injection.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vacuum insulated appliance, comprising:
 a cabinet including:
  an outer wrapper; and
  an inner liner coupled to the outer wrapper to define an insulation cavity,
 wherein the cabinet defines a passthrough opening through the outer wrapper and the inner liner;
 a passthrough cover coupled to the outer wrapper over the passthrough opening, wherein the passthrough cover has a bottom wall defining at least one service hole;

a passthrough cavity defined between the cabinet and the passthrough cover;
at least one foam injection port defined by the passthrough cover; and
an expanding foam disposed within the passthrough cavity, wherein the expanding foam is configured to be inserted through the at least one foam injection port to at least partially fill the passthrough cavity.

2. The vacuum insulated appliance of claim 1, wherein the passthrough cover includes a back wall spaced from the outer wrapper by a pair of side walls extending from the back wall to the outer wrapper, and wherein the at least one foam injection port is defined on the back wall of the passthrough cover.

3. The vacuum insulated appliance of claim 2, wherein the at least one foam injection port includes a first foam injection port and a second foam injection port, and wherein the first foam injection port is defined on an upper portion of the back wall of the passthrough cover and the second foam injection port is defined on a mid-portion of the back wall of the passthrough cover.

4. The vacuum insulated appliance of claim 1, wherein the passthrough cover includes a pair of sidewalls extending from a back wall, and wherein the passthrough cover defines a pair of slots defined by the bottom wall and the pair of side walls, respectively, for expansion of the expanding foam.

5. The vacuum insulated appliance of claim 1, further comprising:
a service connection routed through the at least one service hole, through the passthrough cavity, and through the passthrough opening, wherein the expanding foam at least partially fills the passthrough cavity around the service connection.

6. The vacuum insulated appliance of claim 1, wherein the expanding foam is a polyurethane-based expanding foam.

7. The vacuum insulated appliance of claim 1, further comprising:
first and second service connections, wherein the at least one service hole includes a first service hole and a second service hole, and wherein the first service connection is routed through the first service hole and the second service connection is routed through the second service hole, each of the first service connection and the second service connection extending through the passthrough opening.

8. The vacuum insulated appliance of claim 1, further comprising:
first and second service connections, wherein the cabinet defines a second passthrough opening through the outer wrapper and the inner liner, and wherein the at least one service hole includes a first service hole and a second service hole, and further wherein the first service connection is routed through the first service hole and the second service connection routed through the second service hole.

9. The vacuum insulated appliance of claim 8, wherein the cabinet defines a first compartment and a second compartment, and wherein the passthrough opening defines a passage from outside the cabinet to the first compartment and the second passthrough opening defines a passage from outside the cabinet to the second compartment.

10. A vacuum insulated assembly, comprising:
a vacuum insulated structure having a structural wrapper defining an insulation cavity, wherein an at least partial vacuum is defined in the insulation cavity, and wherein a passthrough opening is defined through the vacuum insulated structure;
a passthrough cover coupled to the vacuum insulated structure over the passthrough opening, wherein the passthrough cover has a bottom wall defining a service hole, and wherein a foam injection port is defined by the passthrough cover;
a foam cavity at least partially defined between the structural wrapper and the passthrough cover; and
an expanding foam at least partially filling the foam cavity, wherein the foam injection port is configured to allow injection of the expanding foam in the foam cavity.

11. The vacuum insulated assembly of claim 10, wherein the passthrough cover includes a pair of sidewalls extending from the back wall, and wherein the passthrough cover defines a pair of slots defined by the bottom wall and a pair of side walls, respectively, for expansion of the expanding foam.

12. The vacuum insulated assembly of claim 10, further comprising:
a grommet coupled to the vacuum insulated structure in the passthrough opening to maintain the at least partial vacuum in the insulation cavity.

13. The vacuum insulated assembly of claim 10, wherein the foam injection port is defined on an upper portion of a back wall of the passthrough cover.

14. The vacuum insulated assembly of claim 10, further comprising:
a service connection routed through the service hole, through the foam cavity, and through the passthrough opening, wherein the expanding foam at least partially surrounds the service connection.

15. A method for manufacturing a vacuum insulated structure, comprising:
providing a structural wrapper with an insulation cavity, the structural wrapper defining a passthrough opening;
drawing an at least partial vacuum within the insulation cavity;
routing a plurality of service connections through the passthrough opening;
coupling a passthrough cover to the structural wrapper over the passthrough opening;
routing the plurality of service connections through a plurality of service holes defined by a bottom wall of the passthrough cover; and
injecting an expanding and curing foam through at least one injection port of the passthrough cover to at least partially fill a foam cavity defined between the structural wrapper and the passthrough cover around the plurality of service connections, wherein the at least one injection port is defined on a back wall of the passthrough cover.

16. The method of claim 15, wherein the expanding and curing foam is a polyurethane-based expanding and curing foam.

17. The method of claim 15, wherein the step of injecting the expanding and curing foam includes the expanding and curing foam expanding through a pair of slots defined by the bottom wall and a pair of side walls, respectively, of the passthrough cover.

18. The method of claim 15, further comprising:
routing a first service connection of the plurality of service connections through the passthrough opening to a first compartment defined by the structural wrapper; and
routing a second service connection of the plurality of service connections through a second passthrough opening defined by the structural wrapper to a second compartment defined by the structural wrapper.

19. The method of claim 18, further comprising:

routing the first service connection through a first service hole of the plurality of service holes to a mechanical compartment at least partially defined by the structural wrapper; and routing the second service connection through a second service hole of the plurality of service holes to the mechanical compartment.

20. The method of claim 15, wherein the at least one injection port includes a first injection port and a second injection port, and wherein the step of injecting the expanding and curing foam includes:

injecting the expanding and curing foam through the first injection port; and injecting the expanding and curing through the second injection port.

* * * * *